United States Patent
Marchie et al.

(10) Patent No.: US 8,162,118 B2
(45) Date of Patent: Apr. 24, 2012

(54) LASH CONTROL IN A TRANSMISSION COUPLER

(75) Inventors: Mark W. Marchie, Highland, MI (US); Paul W. Erlandson, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 523 days.

(21) Appl. No.: 12/466,397

(22) Filed: May 15, 2009

(65) Prior Publication Data
US 2010/0288594 A1 Nov. 18, 2010

(51) Int. Cl.
*F16D 21/04* (2006.01)
*F16D 11/14* (2006.01)
*F16D 23/04* (2006.01)

(52) U.S. Cl. ........... 192/48.91; 192/53.361; 192/69.7; 192/69.9; 192/108; 74/339

(58) Field of Classification Search .............. 192/53.1, 192/53.361, 69.7, 69.9, 69.91, 108
See application file for complete search history.

(56) References Cited

U.S. PATENT DOCUMENTS

| 1,866,270 A | * | 7/1932 | Schoonmaker | 192/53.1 |
| 2,174,148 A | * | 9/1939 | Vincent | 192/53.361 |
| 2,291,851 A | * | 8/1942 | Wahlberg et al. | 192/69.9 |

* cited by examiner

*Primary Examiner* — Richard M. Lorence
(74) *Attorney, Agent, or Firm* — David B. Kelley, Esq.; MacMillan, Sobanski & Todd, LLC

(57) ABSTRACT

A releasable drive connection includes a ring including teeth angularly spaced about an axis, and grooves, each groove formed in an axial end of the ring and aligned angularly with a space between consecutive ring teeth; and a sleeve supported for axial movement, including first teeth angularly spaced about the axis, engageable with the ring teeth, each first tooth having a first length; and second teeth, each second tooth aligned with one of the first teeth, having an axial length shorter than the first length, and including a pointed end for engaging one of the grooves and permitting the first tooth to extend between and engage consecutive gear teeth.

16 Claims, 3 Drawing Sheets

LASH CONTROL IN A TRANSMISSION COUPLER

BACKGROUND OF THE INVENTION

1. Field of the Invention

This invention relates generally to preventing lash in a coupler assembly, such as a synchronizer or dog clutch for a dual clutch powershift transmission.

2. Description of the Prior Art

A powershift transmission is a geared mechanism having two input clutches, which alternately connect a power source, such as an engine or electric motor, and two transmission input shafts.

The transmission produces multiple gear ratios in forward drive and reverse drive though operation of gearing arranged in a dual layshaft configuration between the transmission input and its output. One input clutch transmits torque between the input and a first layshaft associated principally with even-numbered gears; the other input clutch transmits torque between the transmission input and a second layshaft associated principally with odd-numbered gears. The transmission produces gear ratio changes by alternately engaging a first input clutch and running in a current gear, disengaging the second input clutch, preparing a power path in the gearing for operation in the target gear, disengaging the first clutch, engaging the second clutch and preparing another power path in the gearing for operation in the next gear.

In a dual clutch powershift transmission that is shifted automatically, power is transmitted to alternating gears though separate input clutches, each attached to a separate input shaft. Usually, when the transmission operates in a desired gear, an adjacent gear is preselected, i.e. the gearing is prepared for operation in second gear when the transmission produces first gear, in order to reduce shift response time to second gear from first gear.

When the adjacent gear is pre-selected, however, the rotational inertia of the oncoming, but non-engaged input clutch and its associated input shaft, is coupled to the engaged input clutch and its input shaft. If a sudden disturbance is introduced to the transmission, i.e. the vehicle operator depresses the accelerator pedal quickly causing a rapid increase in throttle position, the engaged input clutch, input shaft and gear experience high torsional acceleration. The non-engaged, oncoming input clutch, input shaft and gear, which is coupled to the engaged clutch, shaft and gear, may oscillate torsionally producing cross gear lash at the connection to the engaged input clutch, input shaft and gear.

This oscillation, which occurs at a low magnitude of torque because only the inertia of the non-engaged elements is involved, may produce an undesirable noise. A need exists in the industry for a technique to preselect a drive path through the transmission without producing cross gear lash and noise.

SUMMARY OF THE INVENTION

A releasable drive connection includes a ring including teeth angularly spaced about an axis, and grooves, each groove formed in an axial end of the ring and aligned angularly with a space between consecutive ring teeth; and a sleeve supported for axial movement, including first teeth angularly spaced about the axis, engageable with the ring teeth, each first tooth having a first length; and second teeth, each second tooth aligned with one of the first teeth, having an axial length shorter than the first length, and including a pointed end for engaging one of the grooves and permitting the first tooth to extend between and engage consecutive gear teeth.

In order to maintain the required back tapering and reduce low torque lash, a parallel method of connecting the coupler sleeve to a non-engaged gear is used. When the coupler sleeve is engaged with the engagement ring, the sleeve is held axially by means of a spring/ball detent, which produces a force sufficient to hold the sleeve in place axially during low torque conditions. When higher torque is applied, most of the torque is transmitted through engaged teeth of the sleeve and engagement ring.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
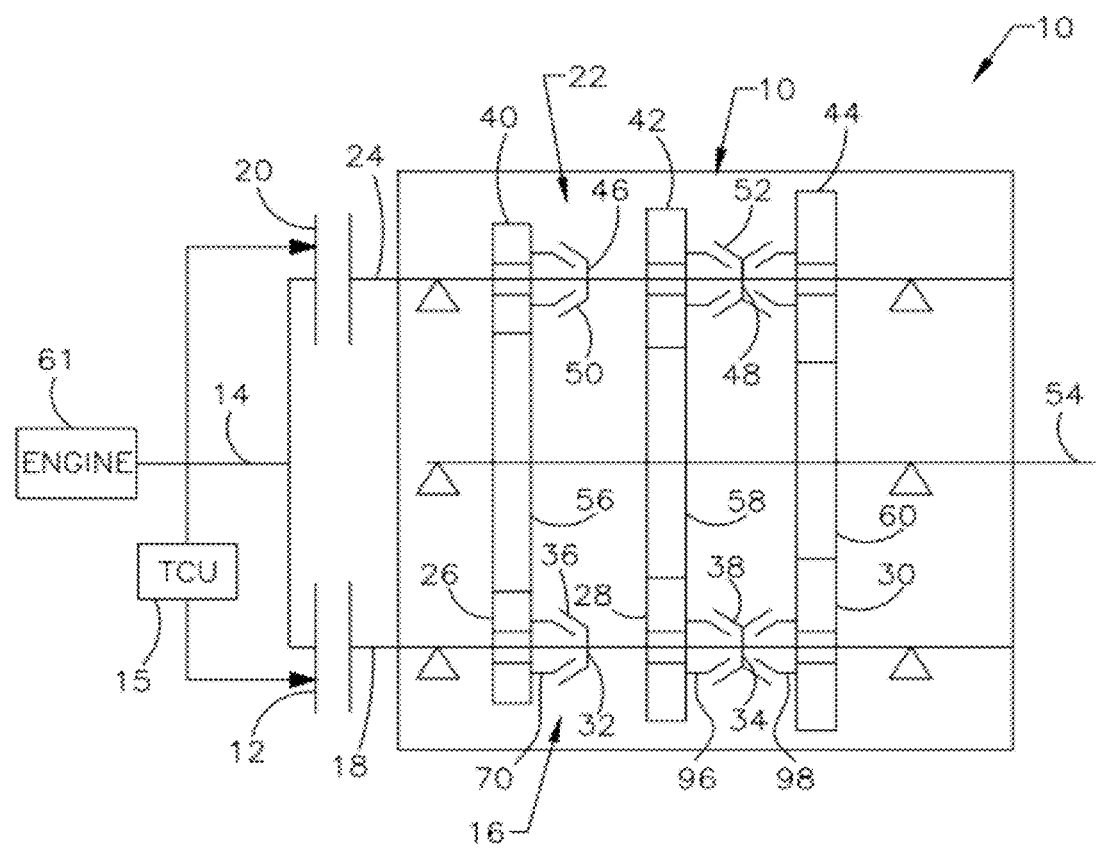
FIG. 1 is a schematic diagram showing details of a dual input clutch powershift transmission.

Referring now to the drawings, there is illustrated in FIG. 1 a dual dry clutch powershift transmission 10 including a first input clutch 12, which selective connects the input 14 of transmission 10 alternately to the even-numbered gears 16 associated with a first layshaft 18, and a second dry input clutch 20, which selective connects the input 20 alternately to the odd-numbered gears 22 associated with a second layshaft 24.

Input 14 is driveably connected to a power source such as an internal combustion engine or an electric motor. An electronic transmission control module (TCM) 15 controls the input clutches 12, 20 through command signals sent to solenoid-actuated servos, which actuate the input clutches. The TCM 15 includes a microprocessor accessible to electronic memory and containing control algorithms expressed in computer code, which are executed repeatedly at frequent intervals.

Shaft 18 supports pinions 26, 28, 30, which are each journalled on layshaft 18, and couplers 32, 34, which are secured to layshaft 18. Pinions 26, 28, 30 are associated respectively with the second, fourth and sixth gears. Coupler 32 includes a sleeve 36, which can be moved leftward to engage pinion 26 and driveably connect pinion 26 to layshaft 18. Coupler 34 includes a sleeve 38, which can be moved leftward to engage pinion 28 and driveably connect pinion 28 to layshaft 18. Sleeve 38 can be moved rightward to engage pinion 30 and driveably connect pinion 30 to layshaft 18.

Shaft 24 supports pinions 40, 42, 44, which are each journalled on layshaft 24, and couplers 46, 48, which are secured to layshaft 24. Pinions 40, 42, 44 are associated respectively with the first, third and fifth gears. Coupler 46 includes a sleeve 50, which can be moved leftward to engage pinion 40 and driveably connect pinion 40 to layshaft 24. Coupler 48 includes a sleeve 52, which can be moved leftward to engage pinion 42 and driveably connect pinion 42 to layshaft 24. Sleeve 52 can be moved rightward to engage pinion 44 and driveably connect pinion 44 to layshaft 24.

Output 54 supports gears 56, 58, 60, which are each secured to shaft 54. Gear 56 meshes with pinions 26 and 40. Gear 58 meshes with pinions 28 and 42. Gear 60 meshes with pinions 30 and 44.

Couplers 32, 34, 46 and 48 may be synchronizers, or dog clutches, or a combination of synchronizers and dog clutches.

The transmission 10 is prepared to accelerate the vehicle from a stop in first gear by engaging a first gear power path and a second gear power path. First gear is selected by using coupler 46 to driveably connect pinion 40 to layshaft 24. Second gear is preselected in preparation for an upshift to second gear by using coupler 32 to driveably connect pinion 26 to layshaft 18.

Power produced by a power source, such as an internal combustion engine 61, is transmitted through the first gear torque path, which includes input 14, input clutch 20, layshaft 24, pinion 40, gear 56 and output 54, which is driveably connected to the driven wheels of the vehicle. An upshift to second gear is then produced by progressively reducing the torque capacity of offgoing input clutch 20 and increasing the torque capacity of oncoming input clutch 12. In second gear, power produced by the engine 61 is transmitted through the second gear power path, which includes input 14, input clutch 12, layshaft 18, pinion 26, gear 56 and output 54.

The point of connection for the engaged input clutch 20, layshaft 24, pinion 40, and gear 56 to the non-engaged input clutch 12, layshaft 18, pinion 26, and gear 56 is a spline interface between the sleeve 36 and an engagement ring 70. This spline connection has a relatively high level of torsional lash due to the need to back taper the spline teeth. High torsional lash contributes to higher torsional impact energy when the lash is crossed, and leads to more pronounced noise. Back tapering is preferred to avoid inadvertent gear disengagement at high torque.

Figure 2:
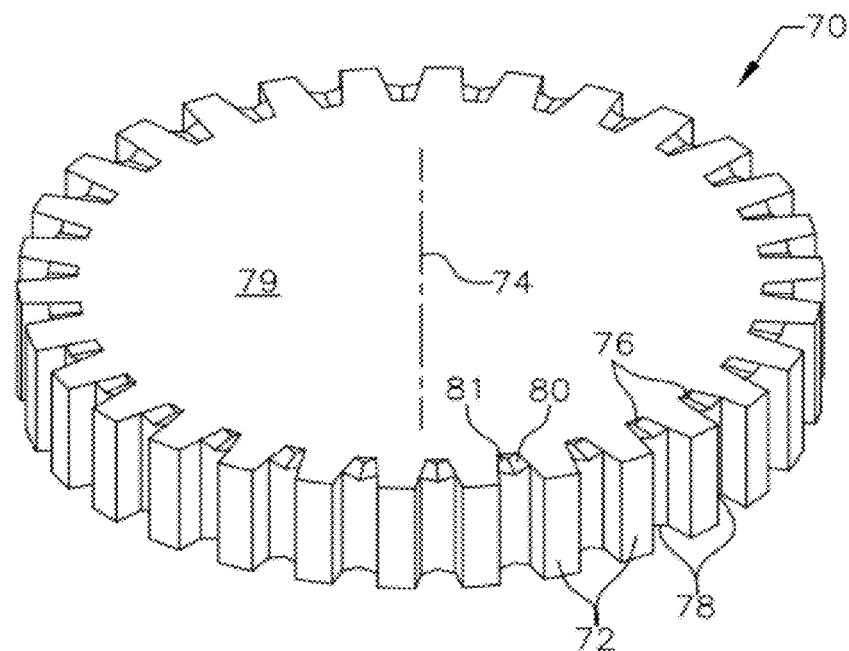
FIG. 2 is perspective view of an engagement ring of one of the couplers.
Figure 3:
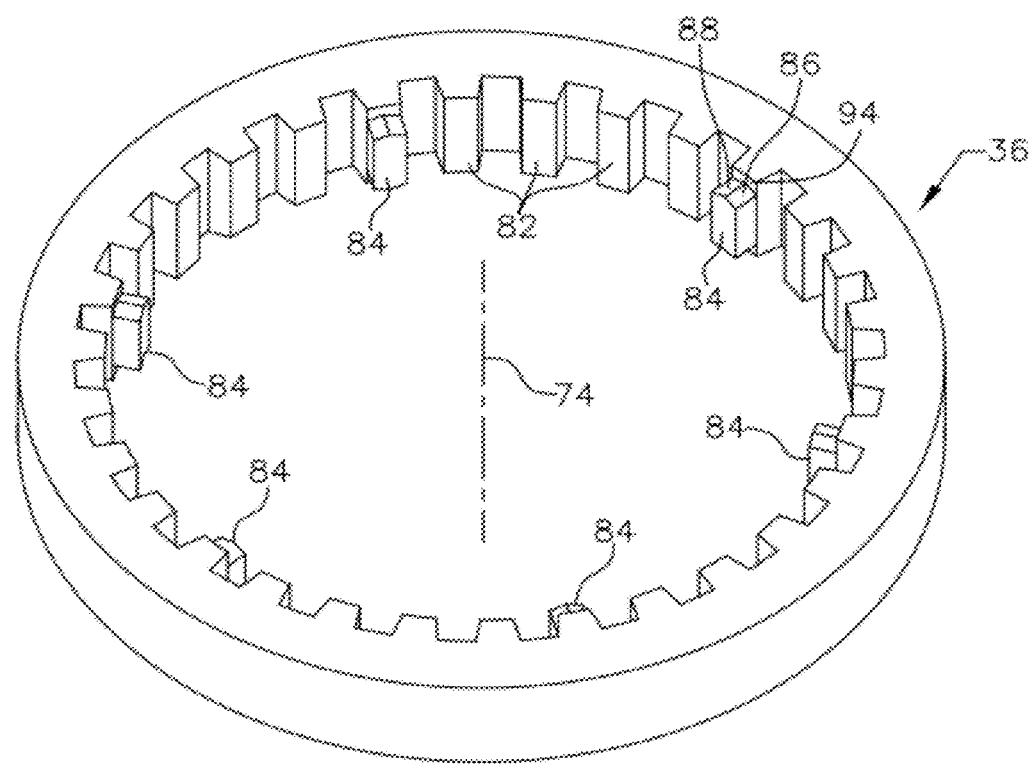
FIG. 3 is perspective view of a sleeve of the coupler.

FIGS. 2 and 3 illustrate the components that form a releasable drive connection between engagement ring 70 and sleeve 36. Ring 70 includes back tapered teeth 72 angularly spaced about an axis 74, and grooves 76 formed in an axial end 79 of the ring 70. Each groove 76 is aligned angularly with a space 78 between consecutive ring teeth 72. Preferably each groove 76 is formed with inclined surfaces 80, 81 which, may meet at a point forming a V-shape, when viewed normal to axis 74. Alternatively, surfaces 80, 81 are inclined toward a flat surface 83 at the base of the groove 76, as shown in FIG. 4.

Coupler sleeve 36, which is supported for axial movement toward and away from ring 70, includes back tapered first teeth 82, angularly spaced about axis 74 and engageable with the teeth 72 of ring 70. Each first tooth 82 has a first axial length. Coupler sleeve 36 also includes second teeth 84 angularly spaced about axis 74, each second tooth being aligned with one of the first teeth 82 and having an axial length shorter than the axial first length.

An axial end of each second tooth 84 is formed with inclined surfaces 86, 88, which may meet at a point forming a V-shape when viewed parallel to axis 74. The pointed end of each second tooth 84 is sized to seat within one of the grooves 76 such that the surfaces 86, 88 of each second tooth 84 contact the surfaces 80, 81 of one of the grooves 76.

Figure 4:
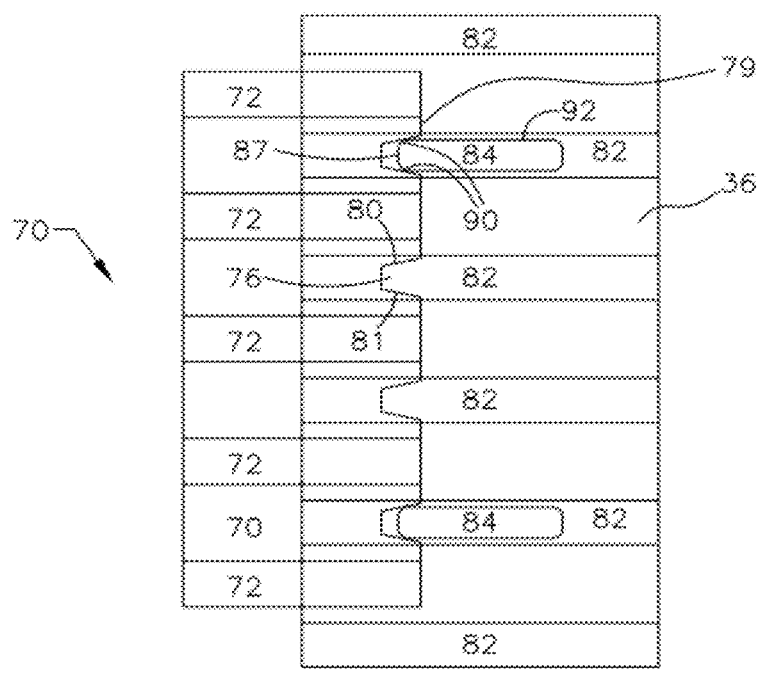
FIG. 4 is a side view showing one of the second teeth of the sleeve engaged with a groove of the engagement ring.

FIG. 4 is a side view showing one of the second teeth of the sleeve engaged with a groove of the engagement ring during a low torque condition. The back tapered teeth of the sleeve are fitted between the back tapered teeth of the engagement ring, but the back tapered teeth are disengaged.

Alternatively, as shown in FIG. 4, coupler sleeve 36 may include second teeth 84 angularly spaced about axis 74, each second tooth 84 being aligned with one of the first teeth 82 and having an axial length shorter than the axial length of the first tooth 82. An axial end of each second tooth 84 is formed with a flat surface 87, which is connected by fillet radii 90 to flanks 92 of the second tooth 84. The radii 90 and flanks 92 are sized to seat within one of the grooves 76 such that the surfaces radii 90 engage by contact with the surfaces 80, 81 of each of the grooves 76.

When the surfaces 86, 88 of each second tooth 84, or the radii of each second tooth 84' contact the surfaces 80, 81 of one of the grooves 76, the portion 94 of the length of each tooth 82 that extends axially past teeth 84, 84' extends also into the spaces 78 between consecutive ring teeth 72.

Figure 5:
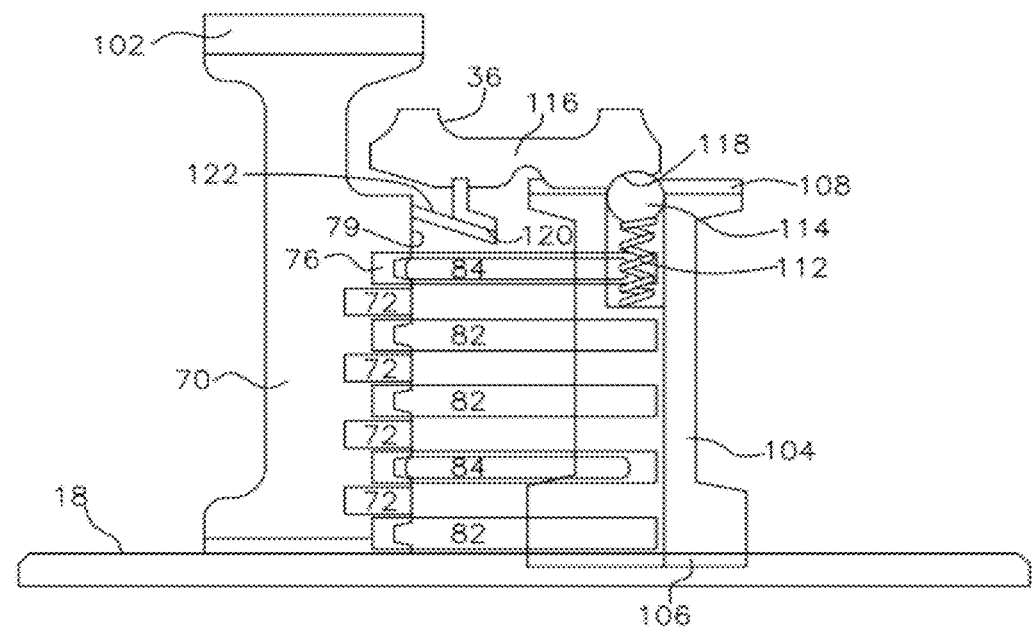
FIG. 5 is a side view of a synchronizer showing and the back tapered teeth of the sleeve fitted between the back tapered teeth of the engagement ring and the second teeth engaged with a groove.

FIG. 5 illustrates a synchronizer 110, which includes coupler sleeve 36, engagement ring 70, formed with gear teeth 102, and hub 104, secured by a spline 106 to layshaft 18 and supporting sleeve on a spline 108 for axial movement toward and away from ring 70.

When coupler sleeve 36 is engaged with engagement ring 70, the sleeve is held axially by a detent 110, which includes a spring 112, ball 114 and recesses 116, 118. Detent 110 produces a force sufficient to hold sleeve 36 in place axially except under high torque conditions. When torque is high, engagement of the back tapered teeth 72 with teeth 82 transmits most of the torque.

The radially inner second teeth 84, 84' of sleeve 36 fit into corresponding grooves 76 machined into the face 79 of ring 70. The axial force applied to sleeve 36 by the spring/ball detent 110 pilots sleeve 36 torsionally to the end face 78.

Engagement of teeth 84, 84' with surfaces 80, 81 of grooves 76 is such that the low magnitudes of torque transmitted through the coupler 110 due to the inertial oscillation from the non-engaged clutch, shaft and gear does not cause the sleeve 36 to disengage from the grooves 76 in the ring face 79, thereby limiting torsional movement of the sleeve relative to the ring 70. This continued engagement avoids full lash cross the back tapered teeth 72, 82 and objectionable noise.

At higher torques, i.e. when the sleeve 36 and ring 70 transmit torque due to shifting transmission 22 from first gear to second gear, the teeth 84, 84' disengage from the grooves 76, allowing substantially all of the torque to be transmitted by engagement of the ring teeth 72 with the sleeve teeth 82.

As coupler sleeve 36 moves axially toward ring 70, a conical surface 120, secured to sleeve 36, contact and engages a conical surface 122, secured to ring 70, thereby synchronizing the rotational speeds of ring 70 and layshaft 18 before the second teeth 84, 84' engage a groove 76, or the back tapered teeth 72, 82 become engaged mutually.

FIG. 1 shows that coupler 34 includes a sleeve 38, which moves in opposite axial directions to connect alternately pinions 28, 30 to layshaft 18. In this arrangement where the sleeve 38 is double acting, two engagement rings 96, 98, each similar to ring 70 are located at opposite side of the sleeve 38, which is substantially identical to sleeve 36. The first ring 96 includes teeth angularly spaced about axis 74, and first grooves, each first groove aligned angularly with a space between consecutive teeth 82 of the sleeve 38. The second ring 98 is spaced axially from the first ring 96 and includes second teeth angularly spaced about axis 74, and second grooves, each second groove aligned angularly with a space between consecutive second teeth 82 of the sleeve 38.

Sleeve 38 includes third teeth angularly spaced about the axis, engageable alternately with the teeth of the first and second rings 96, 98, and fourth teeth, each fourth tooth aligned with one of the third teeth, having an axial length shorter than the length of the third teeth, able to engage one of the first grooves and one of the second grooves, and permitting the third tooth to extend between and to engage alternately consecutive first teeth and second teeth.

The teeth 84, 84' engage alternately the grooves 76 on the rings 96, 98 when the sleeve 38 moves toward each respective ring 96, 98.

In accordance with the provisions of the patent statutes, the preferred embodiment has been described. However, it should be noted that the alternate embodiments can be practiced otherwise than as specifically illustrated and described.

The invention claimed is:

1. A coupler for producing releasable drive connection, comprising:
    a ring including teeth angularly spaced about an axis, and grooves, each groove aligned angularly with a space between consecutive ring teeth; and
    a sleeve supported for axial movement, including first teeth angularly spaced about the axis and engageable with the ring teeth, each first tooth having a first axial length, and second teeth, each second tooth aligned with one of the first teeth, having an axial length shorter than the first length, and able to engage one of the grooves and permitting the first tooth to extend between consecutive ring teeth.

2. The coupler of claim 1, wherein each groove includes mutually inclined walls.

3. The coupler of claim 1, wherein the ring teeth and first teeth are back tapered.

4. The coupler of claim 1, wherein each second tooth is located on one of the first teeth.

5. The coupler of claim 1, wherein each second tooth includes a crest located closer to the axis than a crest of any first tooth.

6. A coupler for producing releasable drive connection, comprising:
    a first ring including teeth angularly spaced about an axis, and first grooves, each first groove and aligned angularly with a space between consecutive teeth;
    a second ring spaced axially from the first ring, including second teeth angularly spaced about the axis, and second grooves, each second groove aligned angularly with a space between consecutive second teeth;
    a sleeve supported for axial movement relative to the first and second rings, including third teeth angularly spaced about the axis, engageable alternately with the teeth of the first and second rings, each third tooth having a first length, fourth teeth, each fourth tooth aligned with one of the third teeth, having an axial length shorter than the first length, and able to engage one of the first grooves and one of the second grooves and permitting the third tooth to extend between and engage alternately consecutive first teeth and second teeth.

7. The coupler of claim 6, wherein each groove includes mutually inclined walls.

8. The coupler of claim 6, wherein the first, second and third teeth are back tapered.

9. The coupler of claim 6, wherein each fourth tooth is located on one of the third teeth.

10. The coupler of claim 6, wherein each fourth tooth includes a crest located closer to the axis than a crest of any third tooth.

11. A synchronizer for producing a releasable drive connection, comprising:
    a hub;
    a ring supported on the hub and including teeth angularly spaced about an axis, and grooves, each groove formed in an axial end of the ring and aligned angularly with a space between consecutive ring teeth;
    a sleeve supported for axial movement, including first teeth angularly spaced about the axis, engageable with the ring teeth, each first tooth having a first axial length; and second teeth, each second tooth aligned with one of the first teeth, having an axial length shorter than the first length, and including a pointed end for engaging one of the grooves and permitting the first tooth to extend between and engage consecutive ring teeth; and
    a detent supported on the hub for releaseably holding the sleeve in selected positions relative to the ring and hub.

12. The synchronizer of claim 11, further comprising:
    a first conical surface secured to the ring; and
    a second conical surface secured to the sleeve and engageable with the first conical surface as the sleeve is moved toward the ring.

13. The synchronizer of claim 11, wherein each groove includes mutually inclined walls.

14. The synchronizer of claim 11, wherein the ring teeth and first teeth are back tapered.

15. The synchronizer of claim 11, wherein each second tooth is located on one of the first teeth.

16. The synchronizer of claim 11, wherein each second tooth includes a crest located closer to the axis than a crest of any first tooth.

* * * * *